(12) United States Patent
Tamura et al.

(10) Patent No.: US 6,734,272 B2
(45) Date of Patent: May 11, 2004

(54) POLYURETHANE RESIN COMPOSITION AND OPTICAL LENS HAVING IMPACT RESISTANCE

(75) Inventors: Kanichi Tamura, Osaka (JP); Shoichi Mitsuuchi, Osaka (JP)

(73) Assignee: Talex Optical Co., Ltd., Osaka (JP)

( * ) Notice: Subject to any disclaimer, the term of this patent is extended or adjusted under 35 U.S.C. 154(b) by 0 days.

(21) Appl. No.: 09/975,513

(22) Filed: Oct. 12, 2001

(65) Prior Publication Data

US 2002/0068809 A1 Jun. 6, 2002

(30) Foreign Application Priority Data

Oct. 13, 2000 (JP) ......................................... 2000-313704

(51) Int. Cl.7 ............................................... C08G 18/10
(52) U.S. Cl. ........................... 528/63; 528/64; 359/642
(58) Field of Search ....................... 528/63, 64; 359/642

(56) References Cited

U.S. PATENT DOCUMENTS

| | | | |
|---|---|---|---|
| 3,510,456 A | 5/1970 | Carr et al. ..................... | 260/75 |
| 5,962,617 A | 10/1999 | Slagel ......................... | 528/61 |
| 6,127,505 A | * 10/2000 | Slagel | |
| 6,177,032 B1 | * 1/2001 | Smith et al. | |

FOREIGN PATENT DOCUMENTS

| | | | |
|---|---|---|---|
| FR | 1528472 | * | 6/1968 |
| WO | 00/17249 | | 3/2000 |

OTHER PUBLICATIONS

Database WPI, Section Ch, Week 198930 Derwent Publication Ltd., London, GB; An 1989–215677 XP002187401 & JP 01 152019 A (Mitsui Toatsu Chem Inc.), Jun. 14, 1989 ★ abstract ★.

* cited by examiner

*Primary Examiner*—Rachel Gorr
(74) *Attorney, Agent, or Firm*—Wenderoth, Lind & Ponack, L.L.P.

(57) ABSTRACT

A polyurethane resin composition for casting is provided which for use as a molding material for optical lenses, resistance to discoloration and durability are excellent and the pot life is long enough take time for casting process. It comprises a polyisocyanate, a polyhydroxy compound and an aromatic polyamine. The aliphatic polyisocyanate is 4,4'-methylene-bis(cyclohexyl isocyanate) or isophorone diisocyanate, the polyhydroxy compound is a polyether diol or polyester diol having an average molecular weight of 700–1200 or their mixture, and the aromatic polyamine is 4,4'-methylene-bis(2-chloroaniline).

2 Claims, No Drawings

POLYURETHANE RESIN COMPOSITION AND OPTICAL LENS HAVING IMPACT RESISTANCE

BACKGROUND OF THE INVENTION

1. Field of the Invention

This invention relates to a polyurethane resin composition for casting, which is a cast molding material for e.g. optical lenses, an impact-resistant optical lens molded from this material, and a method of casting a polyurethane resin.

2. Description of the Related Art

Generally, plastic lenses are lightweight, difficult to break and easy to dye compared with inorganic glass lenses. Thus, in recent years, they are spreading quickly as spectacle lenses, camera lenses, etc.

As resins widely used for plastic lenses, there are diethylene glycol bis(allyl carbonate) resin (CR-39) and thermoplastic resins such as polymethyl methacrylate resins, polystyrene resins and polycarbonate resins.

But inorganic glass lenses and plastic lenses other than polycarbonate resins have a fault that impact resistance is insufficient, so that they tend to crack.

On the other hand, polycarbonate resin lenses are insufficient in the optical properties, though difficult to crack, and in particular, strain tends to occur and resistance to solvents and chemicals are insufficient.

Also, in order to make up for the physical property of inorganic glass lenses and plastic lenses that they tend to crack, laminated safety glass is known. It is formed by superposing a sheet or film of an elastic synthetic resin such as a polyurethane elastomer on the surface of a glass plate or between two or more glass plates and laminating them together.

As a method of manufacturing polyurethane elastomers used in such a way, there are known a method in which a tolylene diisocyanate, represented by Adiprene made by Uniloyal Chemical co., is reacted with polyether polyol and a polyurethane prepolymer obtained is cured by use of an aromatic polyamine, and a method in which a naphthylene diisocyanate, represented by Vulkollans made by Bayer, is reacted with a polyester polyol and the polyurethane prepolymer obtained is cured.

Also, since cured polyurethane elastomers are excellent in the mechanical properties, wear resistance, rebound resilience, etc., they are widely used for paper-making rolls, solid tires, timing belts, etc.

But since these polyurethane elastomers contain an aromatic polyisocyanate, they are insufficient in resistance to discoloration and durability.

Also, another problem is that if a prepolymer manufactured from an aromatic isocyanate is cured with an aromatic polyamine, the pot life is too short to take enough time for casting.

An object of this invention is to provide a polyurethane resin composition which is used as a molding material for optical lenses, has good resistance to discoloration and durability and a long pot life, and allows to take a sufficient time for casting work.

SUMMARY OF THE INVENTION

The inventors of the present application found out that the object can be achieved by reacting an alicyclic diisocyanate with a polyhydroxy compound and curing an isocyanate terminated prepolymer obtained with an aromatic polyamine.

According to the present invention, a polyurethane resin composition which comprises a polyisocyanate, a polyhydroxy compound and an aromatic polyamine, wherein the polyisocyanate is 4,4'-methylene-bis(cyclohexyl isocyanate) or isophorone diisocyanate.

The polyurethane resin composition for casting according to this invention is obtained by reacting an alicyclic polyisocyanate with a polyhydroxy compound and curing an NCO-group terminated prepolymer obtained with a specific aromatic polyamine. Thus, it is a molding material for e.g. optical lenses that is excellent in transparency and impact resistance.

For such a polyurethane resin composition for casting, a preferable polyhydroxy compound is a polyether diol or a polyester diol having an average molecular weight of 700–1200 or their mixture.

Also, the aromatic polyamine is preferably 4,4'-methylene-bis(2-chloroaniline).

According to this invention, there is provided a polyurethane resin composition wherein the polyisocyanate and the polyhydroxy compound are reacted so that the reaction molar ratio of the polyisocyanate to the polyhydroxy compound (NCO/OH) is 2.5 to 4.0 and the NCO content of a polyurethane prepolymer obtained is 7.0 to 14.0%.

Also, in order to obtain an impact-resistant optical lens that solves the above object, an impact-resistant optical lens is formed by casting the abovesaid polyurethane resin composition. Such an impact-resistant optical lens can be used for an eyeglass lens, a sunglass lens or a polarized lens. Also, the abovesaid polyurethane resin composition for casting is applicable to material for optical lenses.

According to this invention, there is also provided a method of casting a polyurethane resin comprising the steps of reacting a polyisocyanate with a polyhydroxy compound to obtain a polyurethane prepolymer so that the reaction molar ratio (NCO/OH) will be 2.5 to 4.0, curing the polyurethane prepolymer obtained having an NCO content of 7.0 to 14.0% with an aromatic polyamine so that the reaction molar ratio (NCO/NH$_2$) will be 1.10 to 0.90, and casting and curing at 60 to 120° C.

DETAILED DESCRIPTION OF THE PREFERRED EMBODIMENT

The polyisocyanate used in this invention is 4,4'-methylene-bis(cyclohexyl isocyanate) or isophorone diisocyanate which is an alicyclic diisocyanate.

If other polyisocyanate is used, the object of this invention cannot be solved. As examples of diisocyanates that cannot be used, hexamethylene diisocyanate, trimethylhexamethylene diisocyanate, hydrogenated XDI, cyclohexane, norbornane diisocyanate, etc. can be cited. If any of them is used, the pot life of the urethane resin obtained would not be sufficiently long.

The polyhydroxy compound used in this invention is a polyether diol or a polyester diol having an average molecular weight of 700–1200 and their mixture.

As the polyether diol, polyoxytetramethylene glycol obtained by subjecting a tetrahydrofuran to ring opening polymerization and other polyether diols can be used. As the polyester diol, known various polyesters can be used, but 1,4-butanediol adipate and 1,6-hexanediol adipate are preferable.

The prepolymer obtained from a polyester diol by reacting with a diisocyanate has a higher viscosity than a prepolymer obtained from a polyether diol. Thus the latter is preferable because of easy casting. Thus, as the polyhydroxy compound used in this invention, a polyether diol is especially preferable.

Also, in order to improve hardness and chemical resistance, an aliphatic polyol having a molecular weight of 300 or under may be used together. As the aliphatic polyol, diols such as ethylene glycol, diethylene glycol, propylene glycol and 1,4-butanediol, and triols such as trimethylol ethane and trimethylol propane may be used.

The aromatic polyamine used in this invention is 4,4'-methylene-bis(2-chloroaniline). A polyurethane obtained by use of any other aromatic polyamine cannot be used for this invention because of short pot life.

If a prepolymer is prepared by reacting a polyisocyanate with a polyhydroxy compound, the reaction molar ratio (NCO/OH) is preferably 2.5–4.0, and the NCO content of the prepolymer obtained is preferably 7.0–14.0%. If the reaction molar ratio and the NCO content are less than the lower limit of these ranges, the viscosity of the prepolymer tends to be so high that the casting process would be difficult and the hardness would be low. Also, if they are higher than the upper limit of these ranges, the physical properties would be poor.

The mixing molar ratio of the prepolymer and aromatic polyamine in this invention (NCO/NH$_2$) is preferably 1.10 to 0.90. Thus known curing conditions can be used.

In order to manufacture an impact-resistant optical lens used for eyeglass lens, a sunglass lens or a polarized lens by casting the composition according to the present invention, a known casting method can be applied.

In casting method, a mold member for molding a lens is provided by fitting concave and convex molds together liquid-tightly through a gasket and a monomer is injected into the cavity of the mold member to polymerize and cure it. In particular, in manufacturing a polarized lens, when the concave and convex molds are fitted together through a ring-like gasket, a polarized element (film) is set in the gasket beforehand. A monomer of a resin raw material is then injected through an injection hole formed in the mold member or the gasket to polymerize and cure so that the resin will cover both surfaces of the polarized element.

EXAMPLES AND COMPARATIVE EXAMPLES

In the following Examples and Comparative Examples, all the "parts" and "%" are "parts by weight" and "wt %" if not otherwise defined.

[Manufacture of the Prepolymer]

Manufacturing Example 1

In a 500 ml separable flask provided with a thermometer, agitator and nitrogen-sealing pipe, 200 parts of polyoxytetramethylene glycol (PTG-1000N made by Hodogaya Chemical Industry) having an average molecular weight of 1014 was taken, heated while agitating in a nitrogen atmosphere, and dehydrated for one hour at a reduced pressure of 100–110° C./3–5 mmHg. After dehyration, 170 parts of 4,4'-methylene-bis(cyclohexyl isocyanate) (Desmodur W made by Sumitomo Bayer Urethane) was added and reacted for two hours at 120–130° C. to manufacture a prepolymer.

The prepolymer obtained was a colorless, transparent liquid having the NCO content of 9.9% and the viscosity of 8600 mPa·s/30° C. 750 mPa·s/60° C. This polymer is designated A.

Manufacturing Example 2

Using the same device as in Manufacturing Example 1, 200 parts of polyoxytetramethylene glycol having an average molecular weight of 1014 and 4 parts of trimethylol propane were taken in a separable flask and dehydrated under the same conditions as in Manufacturing Example 1. After dehyration, 190 parts of 4,4'-methylene-bis (cyclohexyl isocyanate) was added and reacted for two hours at 120–130° C.

The prepolymer obtained was a substantially colorless, transparent liquid having the NCO content of 10.1% and the viscosity of 8000 mPa·s/30° C., 920 mPa·s/60° C. This polymer is designated B.

Manufacturing Example 3

Using the device of Manufacturing Example 1, 200 parts of polyoxytetramethylene glycol having an average molecular weight of 1014 was taken in a separable flask and dehydrated under the same conditions as in Manufacturing Example 1. After dehyration, 131 parts of isophorone diisocyanate (Desmodur 1 made by Bayer) was added and reacted for two hours at 120–130° C. The prepolymer obtained was a substantially colorless, transparent liquid having the NCO content of 9.7% and the viscosity of 6900 mPa·s/30° C., 900 mPa·s/60° C. This polymer is designated C.

Manufacturing Example 4

Using the device of Manufacturing Example 1, 200 parts of polyoxytetramethylene glycol having an average molecular weight of 1014 and 4 parts of trimethylol propane were taken in a separable flask and dehydrated under the same conditions as in Manufacturing Example 1. After dehyration, 155 parts of isophorone diisocyanate was added and reacted for two hours at 120–130° C. The prepolymer obtained was a substantially colorless, transparent liquid having the NCO content of 10.4% and the viscosity of 9400 mPa·s/30° C., 1200 mPa·s/60° C. This polymer is designated D.

Manufacturing Example 5

Using the device of Manufacturing Example 1, 200 parts of 1,6-hexanediol adipate (Nippollan 164 made by Nippon Polyurethane) having an average molecular weight of 1007 was taken in a separable flask and dehydrated under the same conditions as in Manufacturing Example 1. After dehyration, 170 parts of 4,4'-methylene-bis(cyclohexyl isocyanate) was added and reacted for two hours at 120–130° C. The prepolymer obtained was a substantially colorless, transparent liquid having the NCO content of 9.0% and the viscosity of 19000 mPa·s/30° C., 2000 mPa·s/60° C. This polymer is designated E.

Manufacturing Example 6

Using the device of Manufacturing Example 1, 200 parts of 1,6-hexanediol adipate having an average molecular weight of 1007 and 4 parts of trimethylol propane were taken in a separable flask and dehydrated under the same conditions as in Manufacturing Example 1. After dehyration, 199 parts of 4,4'-methylene-bis(cyclohexyl isocyanate) was added and reacted for two hours at 120–130° C. The prepolymer obtained was a substantially colorless, transparent liquid having the NCO content of 10.1% and the viscosity of 22000 mPa·s/30° C., 2100 mPa·s/60° C. This polymer is designated F.

Manufacturing Example 7

Using the device of Manufacturing Example 1, 200 parts of polyoxytetramethylene glycol having an average molecular weight of 1014 was taken in a separable flask and dehydrated under the same conditions as in Manufacturing Example 1. After dehyration, 104 parts of 4, 4'-methylene-bis(cyclohexyl isocyanate) was added and reacted for two hours at 120–130° C. The prepolymer obtained was a substantially colorless, transparent liquid having the NCO content of 5.5% and the viscosity of 30000 mPa·s/30° C., 2700 mPa·s/60° C. This polymer is designated G.

Manufacturing Example 8

Using the device of Manufacturing Example 1, 200 parts of polyoxytetramethylene glycol having an average molecular weight of 1014 was taken in a separable flask and dehydrated under the same conditions as in Manufacturing Example 1. After dehyration, it was cooled to 80° C., 103 parts of tolylene diisocyanate (Coronate F made by Nippon Polyurethane) was added and reacted for five hours at 80–85° C. The prepolymer obtained was a light yellow, transparent liquid having the NCO content of 10.8% and the viscosity of 2000 mPa·s/30° C., 150 mPa·s/60° C. This polymer is designated H.

Manufacturing Example 9

In Manufacturing Example 8, a prepolymer was obtained with 70 parts of tolylene diisocyanate. The prepolymer obtained was a light yellow, transparent liquid having the NCO content of 6.3% and the viscosity 7000 mPa·s/30° C., 600 mPa·s/60° C. This polymer is designated I.

Example 1

100 g of the prepolymer A obtained in Manufacturing Example 1 was heated to 70° C., defoamed by reducing the pressure, and mixed while defoaming with 31.4 g of 4,4'-methylene-bis(2-chloroaniline) which had been melted at 120° C. The mixture was injected into a mold pre-heated to 100° C. and cured at 100° C. for 24 hours. The mixing molar ratio (NCO/NH$_2$) at this time was 1.0. The physical properties of the cast article obtained are shown in Table 1.

Examples 2–6

For the prepolymers B-F obtained in Manufacturing Examples 2–6, too, cast articles were formed in the same manner as in Example 1. Their physical properties are shown in Table 1.

Comparative Example 1

Using the prepolymer G of Manufacturing Example 7, casting was carried out in the same manner as in Example 1. The viscosity of the prepolymer was so high that casting work was difficult.

Comparative Example 2

Using the prepolymer H of Manufacturing Example 8, casting was carried out in the same manner as in Example 1. The viscosity of the prepolymer was low and processability was good, but the pot life was short.

Comparative Example 3

Using the prepolymer I of Manufacturing Example 9, casting was carried out in the same manner as in Example 1. Although the viscosity of the prepolymer was low and processability was good, the pot life was short.

According to the present invention, since it is a polyurethane resin composition comprising a polyisocyanate, a polyhydroxy compound and an aromatic polyamine, it has an advantage that resistance to discoloration and durability are sufficient and the pot life is sufficiently long to take enough time for casting process.

If the polyhydroxy compound is a polyether diol or a polyester diol having a predetermined average molecular weight or a mixture thereof, or the aromatic polyamine is 4,4'-methylene-bis(2-chroaniline), the above effects are obtained more reliably.

Also, if a polyisocyanate and a polyhydroxy compound are reacted so that the reaction molar ratio (NCO/OH) will be within a predetermined range and the NCO content of the polyurethane prepolymer prepared will be within a predetermined range, too, the above effects are obtained more reliably.

Impact-resistant optical lenses such as eyeglass lenses, sunglass lenses or polarized lenses formed by casting the polyurethane resin composition according to this invention has excellent resistance to discoloration and durability and a long pot life. Thus it is possible to take enough time for casting process and to provide optical lenses which have low optical distortion.

Also, with the method according to the present invention, an optical lens can be provided which resistance to discoloration and durability are excellent, and the pot life is long, so that it is possible to take enough time for casting process and to provide optical lenses which have low optical distortion.

TABLE 1

|  |  | Example |  |  |  |  |  | Comp. Ex. |  |  |
|---|---|---|---|---|---|---|---|---|---|---|
|  |  | 1 | 2 | 3 | 4 | 5 | 6 | 1 | 2 | 3 |
| Kind of prepolymer |  | A | B | C | D | E | F | G | H | I |
| Prepolymer | Viscosity$^\times$ | 750 | 920 | 900 | 1200 | 2000 | 2100 | 2700 | 150 | 600 |
|  | Casting Processability | good | good | good | good | good | good | bad | good | good |
|  | Pot life/100° C. (min) | 60 | 60 | 35 | 35 | 45 | 45 | 50 | 5 | 4 |
| Properties | Hardness (shore D) | 71 | 75 | 72 | 76 | 78 | 81 | 40 | 70 | 45 |
| of cured | Tensile strength (MPa) | 46 | 53 | 44 | 60 | 65 | 65 | 38 | 40 | 49 |
| lense sheet | Elongation (%) | 150 | 130 | 230 | 200 | 160 | 130 | 300 | 300 | 350 |

$^\times$(mPa · s)/60° C.

What is claimed is:

1. An impact-resistant polarized optical lens, comprising a polyurethane resin composition, comprising a polyisocyanate, a polyhydroxy compound and an aromatic polyamine, wherein (1) said polyisocyanate is 4,4'-methylene-bis(cyclohexyl isocyanate) or isophorone diisocyanate, (2) said polyhydroxy compound is a polyether diol or a polyester diol having an average molecular weight of 700–1200, or a mixture thereof, (3) said aromatic polyamine is 4,4'-methylene-bis(2-chloroaniline), and (4) said polyisocyanate and said polyhydroxy compound are reacted to form a polyurethane prepolymer, the reaction molar ratio of said polyisocyanate to said polyhydroxy compound (NCO/OH) is 2.5 to 4.0, and the NCO content of the polyurethane prepolymer is 7.0 to 14.0%.

2. The impact-resistant polarized optical lens according to claim 1, which is a transparent lens or sunglass lens.

* * * * *